United States Patent
Hirai

(10) Patent No.: US 9,013,606 B2
(45) Date of Patent: Apr. 21, 2015

(54) IMAGE PROCESSING APPARATUS AND CONTROL METHOD THEREOF

(75) Inventor: Shinya Hirai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/115,058

(22) PCT Filed: Jun. 18, 2012

(86) PCT No.: PCT/JP2012/066095
§ 371 (c)(1),
(2), (4) Date: Oct. 31, 2013

(87) PCT Pub. No.: WO2013/002156
PCT Pub. Date: Jan. 3, 2013

(65) Prior Publication Data
US 2014/0071314 A1  Mar. 13, 2014

(30) Foreign Application Priority Data

Jun. 28, 2011  (JP) .................... 2011-143390

(51) Int. Cl.
| | |
|---|---|
| *H04N 5/76* | (2006.01) |
| *G06K 9/32* | (2006.01) |
| *H04N 5/345* | (2011.01) |
| *H04N 5/208* | (2006.01) |
| *H04N 9/04* | (2006.01) |

(52) U.S. Cl.
CPC ............ *H04N 5/3458* (2013.01); *H04N 5/208* (2013.01); *H04N 9/045* (2013.01)

(58) Field of Classification Search
None
See application file for complete search history.

(56) References Cited

U.S. PATENT DOCUMENTS

| | | | | |
|---|---|---|---|---|
| 4,829,368 | A | * | 5/1989 | Kobayashi et al. ......... 348/222.1 |
| 4,992,854 | A | * | 2/1991 | Aso et al. ..................... 348/712 |
| 5,335,069 | A | * | 8/1994 | Kim .............................. 348/630 |
| 6,816,193 | B1 | | 11/2004 | Kohashi et al. |
| 8,294,791 | B2 | * | 10/2012 | Iwabuchi ..................... 348/241 |
| 2005/0074224 | A1 | | 4/2005 | Hayashi |
| 2011/0181651 | A1 | | 7/2011 | Mizutori et al. |

FOREIGN PATENT DOCUMENTS

| | | |
|---|---|---|
| JP | 2010-004472 A | 1/2010 |
| JP | 2011-143390 A | 7/2011 |

OTHER PUBLICATIONS

PCT International Search Report and Written Opinion of the International Searching Authority, mailed Aug. 16, 2012 in PCT/JP2012/066095.

* cited by examiner

*Primary Examiner* — Albert Cutler
(74) *Attorney, Agent, or Firm* — Fitzpatrick, Cella, Harper & Scinto

(57) ABSTRACT

In an image processing apparatus, a reduced image in which an input image having a color pattern of a plurality of colors of different pixel densities is reduced is generated. A luminance signal is generated from the reduced image. A contour compensation signal is generated from weighted color signals of the reduced image. The luminance signal and the contour compensation signal are combined. If a reduction ratio of the reduced image is greater than a threshold, a weighting used for a color signal for which a pixel density is high in the input image is increased in comparison to a case where the reduction ratio is not greater to the threshold.

10 Claims, 6 Drawing Sheets

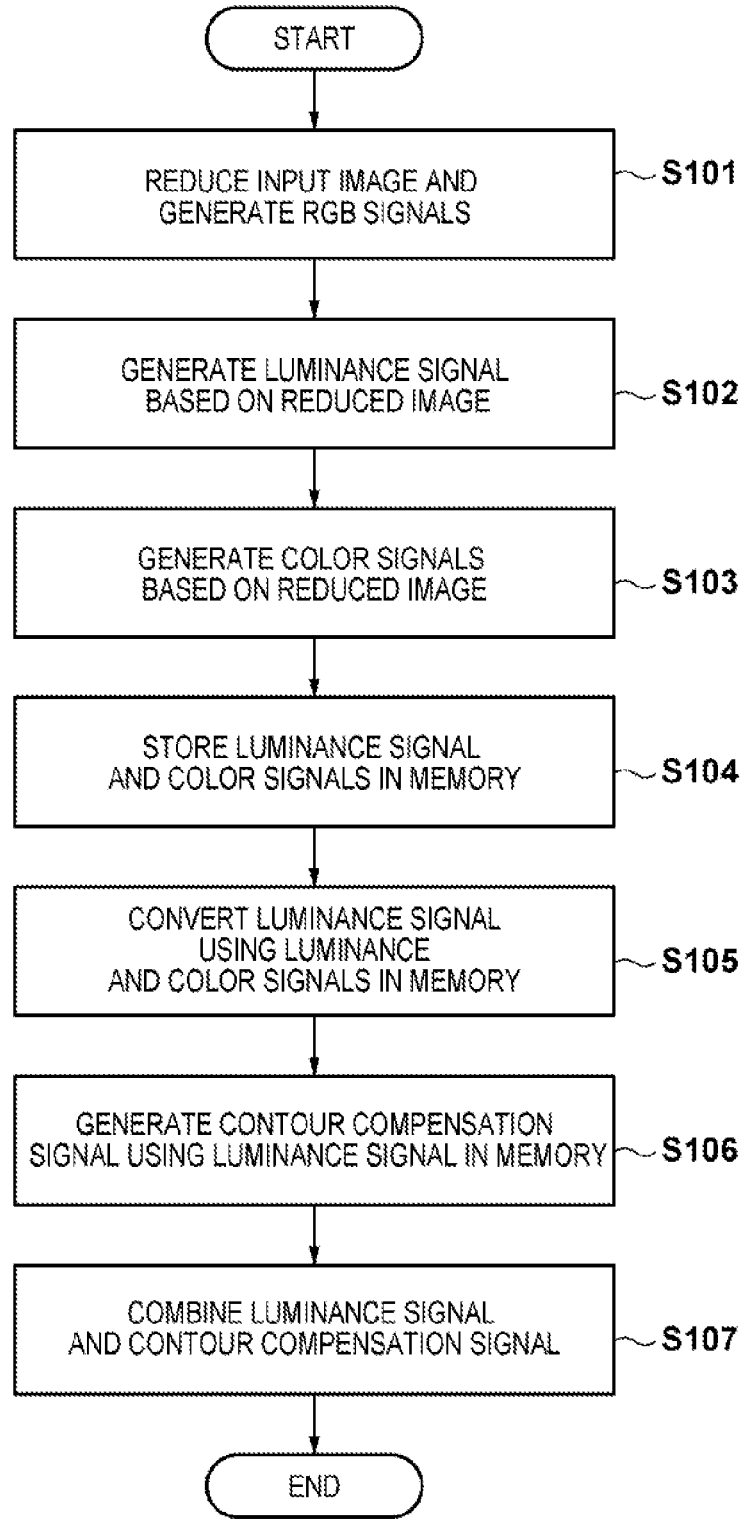

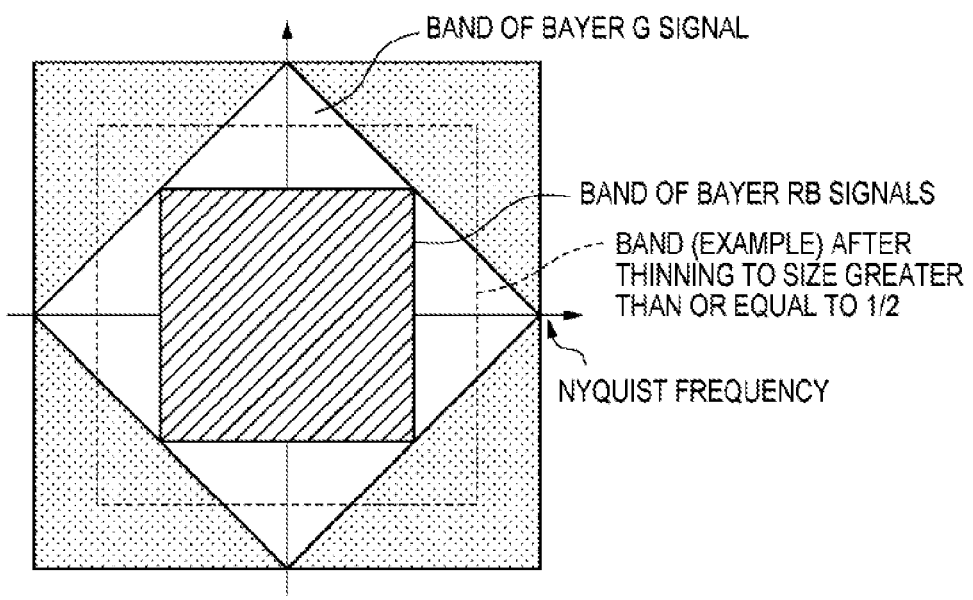

IMAGE PROCESSING APPARATUS AND CONTROL METHOD THEREOF

TECHNICAL FIELD

The present invention relates to image processing technology that generates a reduced image based on signals obtained from an image sensor.

BACKGROUND ART

In recent years, image sensors such as CMOS sensors have evolved, and it has become possible to read out a captured image signal at high speed. As a result, the number of pixels of moving images such as full-HD moving images and 4K2K moving images has been increasing. Further, since it is also possible to obtain an oversampling effect by reading out signals of pixels in a manner such that the number of pixels for which readout is performed from an image sensor is greater than the number of recording pixels of a moving image and generating an image while thinning the signals during processing, it has become possible to generate high-definition moving images.

On the other hand, there is an upper limit to the number of pixels that can be processed so as to satisfy a frame rate requirement of a moving image, and if the upper limit is exceeded it is necessary to adopt a countermeasure in a development process. For example, when development is performed with respect to pixels that have been read out from an image sensor without changing the number of pixels and the image is not reduced until the final stage of the process, a heavy load is placed on the processing system because a large number of data items undergo processing. Therefore, a method can be considered which decreases a data amount to be processed by reducing an image at the earliest possible stage after performing a read-out operation from the image sensor, and subjecting the image after reduction to a development process.

For example, the following process is known as a process that performs thinning at the stage of a RAW image that has been obtained from an image sensor (Japanese Patent Laid-Open No. 2010-004472). According to the aforementioned process, a luminance signal and color signals are generated based on a RAW image; a filtering process is performed with respect to the luminance signal and the color signals, respectively; and thereafter pixels are thinned. The luminance signals and color signals that have been thinned are combined and returned to a RAW image. Because the process is configured in this manner, thinning processing can be implemented with respect to a RAW image. Further, a method has been disclosed that prevents aliasing due to thinning by changing filter coefficients when performing thinning in accordance with a reduction ratio.

However, the above described conventional methods do not give consideration to the fact that a band of a signal obtained from an image sensor differs depending on the color filter pattern and color signals of the sensor. There is thus a possibility that adverse effects of aliasing will arise when thinning processing is merely performed uniformly simply as a luminance signal.

For example, a case in which the pattern of a color filter of an image sensor is a Bayer pattern as shown in FIG. 6 will now be described. In the case of a filter pattern shown in FIG. 6, if G1 and G2 are regarded as the same G signal, the density of pixels with a G signal will be higher than the pixel density for each of the R and B signals, and a band of the G signal and bands of the R and B signals will be as shown in FIG. 7, respectively. The x-axis indicates the frequency space of an imaging subject in the horizontal (H) direction, the y-axis indicates the frequency space in the vertical (V) direction, and the spatial frequency increases with increasing distance from the origin point. A band of the G signal is within a white region (including a diagonal line region), and a region outside the white region represents an aliasing signal. In the white region, bands in the horizontal and vertical directions are equal to or less than a Nyquist frequency, and bands in oblique 45-degree and 135-degree directions are equal to or less than a frequency represented by $1/\sqrt{2}$ of the Nyquist frequency. Further, bands of the R and B signals are within the diagonal line region, and a region outside the diagonal line region represents an aliasing signal. In the diagonal line region, bands in the horizontal and vertical directions are equal to or less than ½ of the Nyquist frequency, and bands in oblique 45-degree and 135-degree directions match with the white region. When an image that has been read out from the image sensor is reduced to a size that is equal to or less than ½ of the original size in the horizontal and vertical directions, since only signals within the bands (diagonal line region) remain for all of the color signals, there is almost no residual aliasing signal. On the other hand, when an image that has been read out from the image sensor is reduced to a size that is greater than or equal to ½ of the original size, for example, since bands within the broken line in the figure remain, with respect to the G signal, although diagonal aliasing (halftone dot region part) remains, almost no aliasing remains in the horizontal and vertical directions. However, with respect to the R and B signals, since an aliasing portion (the outside of the diagonal line region) already exists from before reducing is performed, an aliasing signal remains after reducing also.

SUMMARY OF INVENTION

The present invention addresses the above-described problems. More specifically, the present invention makes it possible to favorably suppress an aliasing signal when performing development by converting the number of pixels of a signal obtained from an image sensor into a smaller number of pixels.

According to an aspect of the present invention, there is provided an image processing apparatus, comprising reduction means for generating a reduced image in which an input image having a color pattern of a plurality of colors of different pixel densities is reduced, luminance signal generation means for generating a luminance signal based on the reduced image, contour compensation signal generation means for weighting color signals of the reduced image and generating a contour compensation signal based on the weighted color signals, and combination means for combining the luminance signal and the contour compensation signal, wherein when a reduction ratio that indicates a ratio of a number of pixels of the reduced image with respect to the input image is greater than a threshold, the contour compensation signal generation means increases a weighting used for a color signal for which a pixel density is high in the input image in comparison to a case where the reduction ratio is less than or equal to the threshold.

According to the present invention, it is possible to obtain an image in which aliasing has been favorably suppressed when reducing and developing a signal obtained from an image sensor.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

FIG. 5 is a flowchart that illustrates contents of processing executed by the image processing circuit shown in FIG. 4.

FIG. 6 is a view that illustrates an example of a color filter pattern of an image sensor.

FIG. 7 is a view that describes bands of color signals obtained from an image sensor.

DESCRIPTION OF EMBODIMENTS

Various exemplary embodiments, features, and aspects of the invention will be described in detail below with reference to the drawings.

First Embodiment

Figure 1:
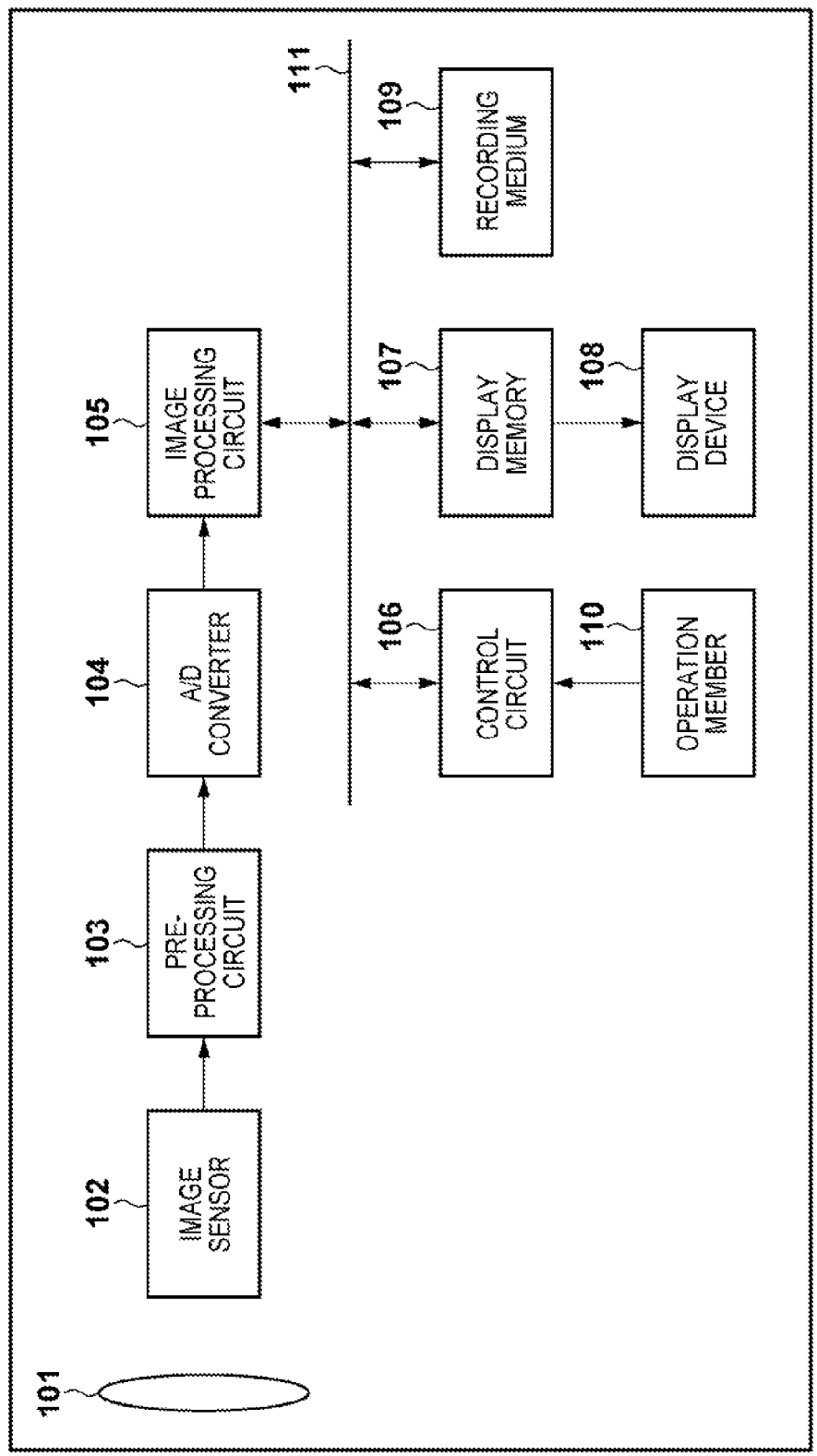
FIG. 1 is a view that illustrates a schematic configuration of a digital camera according to embodiments of the present invention.

FIG. 1 is a view that illustrates a schematic configuration of a digital camera according to embodiments of the present invention. The present invention can be realized by other image processing apparatuses, such as digital video cameras and personal computers, and is not limited to a digital camera, as long as the image processing apparatuses can perform image processing on image signals.

In FIG. 1, an optical system 101 includes a lens group including a zoom lens and a focus lens, an aperture apparatus, and a shutter apparatus. The optical system 101 controls magnification and a focus position of a subject image that arrives at an image sensor 102 and a light amount. The image sensor 102 is a photoelectric converter such as a CCD (Charge Coupled Device) or a CMOS (Complementary Metal Oxide Semiconductor) sensor, and converts a subject image into an electrical signal to generate an image signal. In the present embodiment, it is assumed that the image sensor 102 is constituted by a CCD. It is also assumed that the image sensor 102 has a color pattern of a plurality of colors such as, for example, a Bayer-type color pattern that is shown in FIG. 6.

A pre-processing circuit 103 includes a CDS (Correlated Double Sampling) circuit and an amplifier circuit. The CDS circuit suppresses a dark current included in an image signal generated by the image sensor 102. The amplifier circuit amplifies an image signal that has been output from the CDS circuit. An A/D converter 104 converts an image signal that has been output from the pre-processing circuit 103 into a digital image signal.

An image processing circuit 105 performs white balance processing, noise suppression processing, gradation conversion processing, edge enhancement correction processing and the like with respect to the image signal, and outputs the image signal as a luminance signal Y and color-difference signals U and V. The image processing circuit 105 also calculates a luminance value of the subject and a focus value representing a focus state of the subject based on the image signal. The image processing circuit 105 can perform image processing not only on an image signal that has been output from the A/D converter 104, but can perform similar image processing on an image signal read out from a recording medium 109.

A control circuit 106 controls each circuit included in the digital camera of the present embodiment so as to control the operations of the digital camera. The control circuit 106 also performs driving control of the optical system 101 and the image sensor 102 based on a luminance value obtained from the image signal that has been processed by the image processing circuit 105 or an instruction that is sent from an operation member 110.

A display memory 107 temporarily stores an image signal that serves as the source of an image to be displayed by a display device 108. The display device 108 includes a liquid crystal display or an organic EL (Electro Luminescence) display, and displays an image using an image signal generated by the image sensor 102 or an image signal read out from the recording medium 109. The display device 108 can also update and display, as the need arises, image signals that are consecutively read out from the image sensor 102 to thereby function as an electronic viewfinder. The display device 108 can display not only images, but also a display state of the digital camera, a shutter speed selected by a user or determined by the camera, an aperture value, text information such as sensitivity information, and a graph that shows a luminance distribution measured by the image processing circuit 105 and the like. The recording medium 109 may be detachable from the digital camera or may be incorporated into the digital camera.

The operation member 110 is operated by a user to send an instruction to the digital camera. A bus 111 is used for exchanging image signals between the image processing circuit 105, the control circuit 106, the display memory 107, and the recording medium 109.

Next, an example of the operations of the digital camera according to the present embodiment at a time of movie recording will be described.

When the user operates the operation member 110 to send an instruction to start image capturing preparation to the digital camera, the control circuit 106 starts controlling operations of the respective circuits.

The image sensor 102 performs photoelectric conversion of a subject image that has passed through the optical system 101 so as to generate an analog image signal. The A/D converter 104 digitalizes the analog image signal that has been processed by the pre-processing circuit 103. The image processing circuit 105 performs white balance processing, noise suppression processing, tone conversion processing, contour correction processing or the like on the image signal that has been output from the A/D converter 104.

The image signal processed by the image processing circuit 105 is displayed as an image on the display device 108 through the display memory 107. As described above, the image sensor 102 consecutively generates image signals, and the display device 108 updates and displays images of the subject in real time using the consecutive image signals that are read out to thereby function as an electronic viewfinder.

These processes are repeated until the user operates a shutter button included in the operation member 110. When the user operates the shutter button, an image signal that is output to the recording medium 109 from the image processing circuit 105 is recorded.

Figure 2:
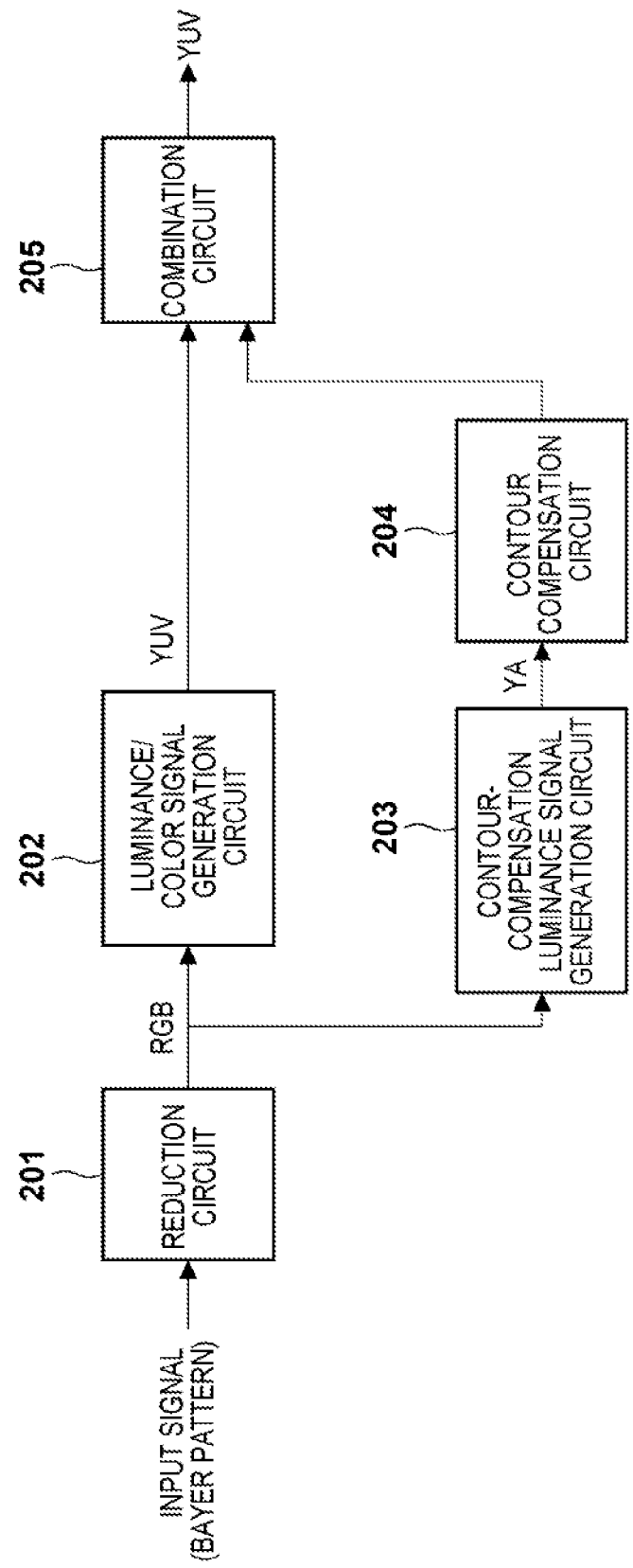
FIG. 2 is a view that illustrates part of a configuration of an image processing circuit according to a first embodiment.

The development processing performed by the image processing circuit 105 that is a feature of the present invention will now be described in detail. FIG. 2 is a view that shows part of the configuration of the image processing circuit 105.

The image processing circuit 105 of the present embodiment includes a reduction circuit 201, a luminance/color signal generation circuit 202, a contour-compensation luminance signal generation circuit 203, a contour compensation circuit 204, and a combination circuit 205.

Figure 3:
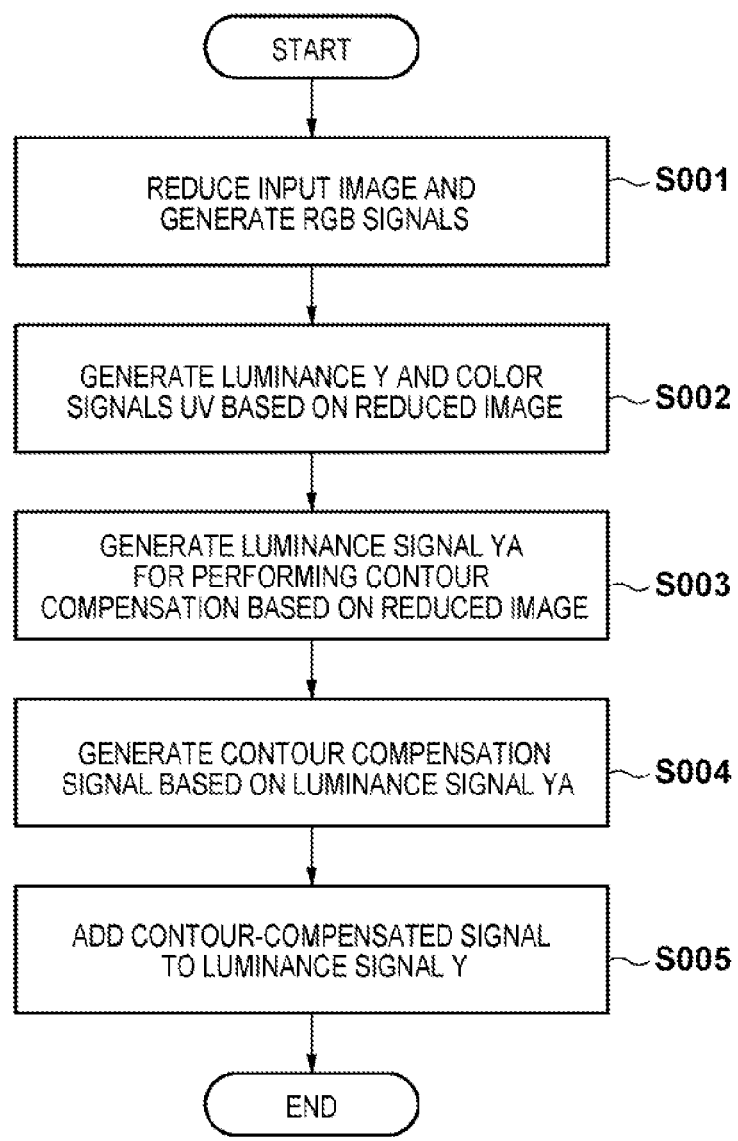
FIG. 3 is a flowchart that illustrates contents of processing executed by the image processing circuit shown in FIG. 2.

FIG. 3 is a flowchart for describing the processing contents of the above described circuits. Upon receiving an image signal output from the A/D converter 104, the image processing circuit 105 performs the processing illustrated in the flowchart shown in FIG. 3. Note that, white balance processing and gradation conversion processing and the like are omitted from the flowchart.

In step S001, the reduction circuit 201 separates R, G1, G2, and B signals of an input image (Bayer pattern) according to the respective color signals, and performs interpolation by applying a low-pass filter with filter coefficients [1, 2, 1] to the respective color signals. Thus, color signals of all of R, G1, G2, and B are generated for each pixel. Further, the reduction circuit 201 generates respective color signals that have been reduced by performing thinning processing in the horizontal and vertical directions at a predetermined reduction ratio with respect to each color signal.

In step S002, the luminance/color signal generation circuit 202 generates a luminance signal Y and color signals U and V using a reduced image of each color signal. The luminance signal is generated, for example, according to the following equation for each pixel of interest.

$Y=0.3R+0.3G1+0.3G2+0.1B$

The color signals are generated, for example, according to the following equations.

$U=B-Y$ $V=R-Y$

In step S003, the luminance signal for contour compensation generation circuit 203 generates a luminance signal YA for performing contour compensation based on each reduced image concurrently with the operations of the luminance/color signal generation circuit 202. A method of generating the contour-compensation luminance signal YA is changed in accordance with a reduction ratio $\alpha$ (0<$\alpha$<1). For example, the contour-compensation luminance signal YA is generated in the following manner:

when $\alpha \leq \frac{1}{2}$, $YA=0.3R+0.3G1+0.3G2+0.1B$ when $\alpha > \frac{1}{2}$, $YA=0.5G1+0.5G2$ The reduction ratio $\alpha$ shows a proportion of the number of pixels in each of the horizontal and vertical directions of an image after reduction with respect to the number of pixels in each of the horizontal and vertical directions of an image that has been read out without thinning from the image sensor 102. More specifically, if the source image is composed of 30,000,000×40,000,000 pixels and reduction ratios $\alpha$ are ½ and ¼, the images after reduction will be composed of 15,000,000×20,000,000 pixels and 7,500,000×10,000,000 pixels, respectively.

According to the present embodiment, if the reduction ratio $\alpha$ is equal to or less than ½, since no aliasing signal remains in the color signals of any of R, G1, G2 and B, the contour-compensation luminance signal YA is generated using the color signals of all of R, G1, G2, and B. In contrast, if the reduction ratio $\alpha$ is greater than ½, when G1 and G2 are regarded as being the same G signal, although no aliasing signal remains in the horizontal and vertical directions in the color signal of G, an aliasing signal remains in the R and B signals. Because the aliasing signal will be emphasized if a contour compensation signal is generated using a luminance signal in which an aliasing signal remains, in such a case the contour-compensation luminance signal YA is generated using only the G1 and G2 signals without using the R and B signals.

In step S004, the contour compensation circuit 204 subjects the contour-compensation luminance signal YA to filter processing to generate a contour compensation signal. The contour compensation signal is generated by applying a band-pass filter to the contour-compensation luminance signal YA. For example, it is sufficient to apply filter coefficients [−1, 0, 2, 0, −1] in each of the horizontal and vertical directions as the band-pass filter. Coring processing for removing noise or clip processing for avoiding the occurrence of a situation in which the amplitude becomes too strong or the like may also be performed with respect to the output of the band-pass filter. Note that changing the color composition ratio of YA in accordance with the reduction ratio corresponds to changing a frequency characteristic of each color constituting the luminance signal in accordance with the reduction ratio.

In step S005, the combination circuit 205 adds the contour compensation signal to the luminance signal Y, and outputs a YUV signal that has undergone contour compensation.

By adopting the above configuration, it is possible to favorably compensate for the resolution since a contour compensation signal is generated based on a luminance signal that is equivalent to the luminance signal Y when the reduction ratio is less than or equal to a previously set threshold (for example, ½). Further, if the reduction ratio is greater than the threshold, by generating a contour compensation signal based on only the G signal for which a pixel density is high, a degree of emphasizing a higher frequency of the G signal relative to the R and B signals is relatively increased in comparison to a case in which the reduction ratio is less than or equal to the threshold. Therefore, it is possible to obtain image signals with few aliasing signals. Alternatively, when the reduction ratio is greater than a previously set value, contour compensation is performed with respect to a luminance signal in which a weighting used for the G signal has been increased. It is thus possible to obtain image signals with few aliasing signals.

In this connection, although in the present embodiment a case is described in which a method of generating a luminance signal to be used in contour compensation is alternatively switched by taking a predetermined threshold as a boundary when the reduction ratio $\alpha$ is changed, the present invention is not limited thereto. A configuration may also be adopted in which luminance signals for contour compensation that are generated by these two methods are weighted in accordance with a value of the reduction ratio $\alpha$ and added. However, when the reduction ratio is greater than ½, it is necessary to set a weighting coefficient so as to relatively increase a degree of emphasizing a higher frequency of the G signal relative to the R and B signals, in comparison to a case where the reduction ratio is less than or equal to ½.

Second Embodiment

Next, a second embodiment of the present invention is described. According to the present embodiment, a configuration in a where the circuit scale is reduced is described. The fundamental configuration of the second embodiment is similar to the first embodiment, and hence the description of second embodiment centers on differences with respect to the first embodiment.

Figure 4:
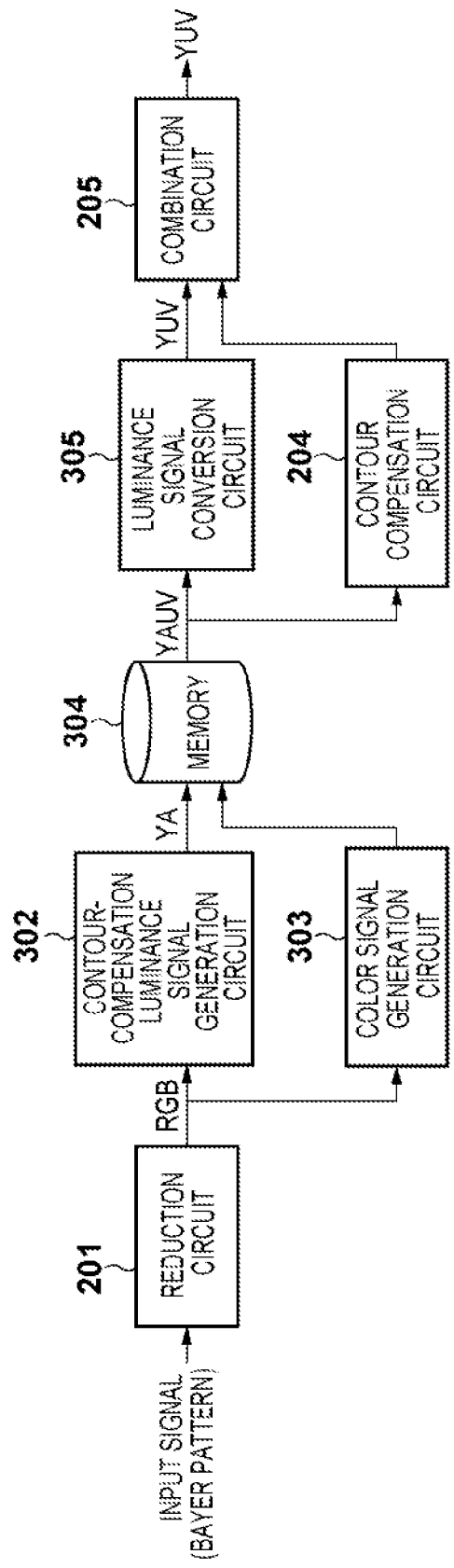
FIG. 4 is a view that illustrates part of a configuration of an image processing circuit according to a second embodiment.

FIG. 4 is a view that illustrates part of the configuration of the image processing circuit 105 according to the present embodiment. In FIG. 4, circuits that have the same configuration as in FIG. 2 are denoted by the same reference numerals as in FIG. 2. Instead of the luminance/color signal generation circuit 202 and the contour-compensation luminance signal generation circuit 203 shown in FIG. 2, according to the present embodiment, the image processing circuit 105 includes a contour-compensation luminance signal generation circuit 302 and a color signal generation circuit 303, and additionally includes a memory 304 and a luminance signal conversion circuit 305.

FIG. 5 is a flowchart for describing the contents of processing executed by the image processing circuit 105 according to the present embodiment.

In step S101, the reduction circuit 201 reduces an input image in a similar manner to the first embodiment to generate a reduced image of each of the color signals R, G1, G2 and B.

In step S102, the contour-compensation luminance signal generation circuit 302 generates the contour-compensation luminance signal YA based on the reduced images. The method of generating the contour-compensation luminance signal YA is changed in accordance with the reduction ratio α (0<α<1). More specifically, the contour-compensation luminance signal YA is generated in the following manner:

$$\text{when } \alpha \leq \tfrac{1}{2}, YA = 0.3R + 0.3G1 + 0.3G2 + 0.1B \quad (1)$$

$$\text{when } \alpha > \tfrac{1}{2}, YA = 0.5G1 + 0.5G2 \quad (2)$$

In step S103, the color signal generation circuit 303 generates color signals based on the reduced images. The color signals are generated as shown in the following equations:

$$U = B - Y0 \quad (3)$$

$$V = R - Y0 \quad (4)$$

$$\text{Where, } Y0 = 0.3R + 0.3G1 + 0.3G2 + 0.1B \quad (5)$$

In step S104, the memory 304 stores the contour-compensation luminance signal YA and the color signals U and V. The circuit scale of the reduction circuit 201 can be reduced by providing the memory 304 in the image processing circuit 105. According to the first embodiment, it is necessary for the reduction circuit 201 to have line memories that are required for reduction processing and contour compensation processing. More specifically, if the contour compensation circuit 204 applies filter coefficients represented by [−1, 0, 2, 0, −1] in the vertical direction as in the first embodiment, it is necessary to input signals for a minimum of 5 lines in the vertical direction to the contour compensation circuit 204. Further, to send images for five lines to the contour compensation circuit 204, the reduction circuit 201 requires line memories of a number obtained by multiplying the inverse of the reduction ratio by the five lines. That is, if the reduction ratio of the reduction circuit 201 is ⅓ and the number of input taps of the band-pass filter of the contour compensation circuit 204 is 5, the reduction circuit 201 requires 15 (3×5) line memories. According to the present embodiment, by storing the output of the reduction circuit 201 in the memory 304 once, the circuit scale can be reduced since it is sufficient to provide only the amount of line memories required for reduction processing in the reduction circuit 201. Furthermore, the amount of line memories of the memory 304 can be reduced by thinning the U and V signals in the horizontal and vertical directions by half in the color signal generation circuit to thereby decrease the information amount. Since YUV signals that are normally recorded are recorded in a manner in which the information of color signals is decreased, such as in the YUV422 on YUV420 format, in this case there is little influence on image quality even when the color signals are thinned.

In step S105, the luminance signal conversion circuit 305 converts the contour-compensation luminance signal YA into a luminance signal Y. The luminance signal Y is generated in the following manner according to the reduction ratio α:

$$\text{when } \alpha \leq \tfrac{1}{2}, Y = YA \quad (6)$$

$$\text{when } \alpha > \tfrac{1}{2}, Y = YA + 0.167U + 0.5V \quad (7)$$

By converting the contour-compensation luminance signal YA into the luminance signal Y in this manner, the same signal can be obtained for Y regardless of α. That is, based on equation (1) to equation (7), the following values are obtained for Y:

$$\text{when } \alpha \leq \tfrac{1}{2}, Y = 0.3R + 0.3G1 + 0.3G2 + 0.1B$$

$$\text{when } \alpha > \tfrac{1}{2}, Y = 0.3R + 0.3G1 + 0.3G2 + 0.1B$$

Thus, the color composition ratio of the luminance signal constituting the direct-current component is the same regardless of α.

In step S106, the contour compensation circuit 204 generates a contour compensation signal based on the contour-compensation luminance signal YA. The contour compensation circuit is the same as in the first embodiment.

In step S107, the luminance signal Y and the contour compensation signal are combined to output a YUV signal.

By adopting the above configuration, it is possible to generate a reduced image in which aliasing has been suppressed while reducing the circuit scale.

Third Embodiment

Next, a third embodiment of the present invention is described. According to the present embodiment, a case is described in which a thinning ratio of pixels output from an image sensor differs between the horizontal direction and the vertical direction.

Depending on the readout speed from an image sensor, when all pixels are read out, a case may arise in which the readout speed is too slow for the frame rate of the moving image. In such a case, for example, for the horizontal direction, all pixels are read out, while for the vertical direction, three pixels of the same color are read out in a manner in which the signals thereof are added together and thinned to thereby decrease the number of pixels in the vertical direction to ⅓. It is thereby possible to increase the frame rate since the number of pixels to be read out decreases. In this connection, a thinning amount in the vertical direction is not limited to ⅓ and may be another thinning amount.

A case where different thinning ratios are used when reading out pixels in the horizontal direction and the vertical direction will now be described. In the following example, when a reduction ratio differs between the horizontal direction and the vertical direction of an input image, a method of generating a contour-compensation luminance signal is selected based on the smaller reduction ratio. In the specific example described hereafter, the configuration of the image processing circuit 105 is the same as in the second embodiment. Further, only a portion of the operations that is different from the second embodiment is described below. Furthermore, a case is described in which, with respect to reading out pixel signals from the image sensor, thinning is only performed in the vertical direction, and thinning in the horizontal direction is not performed.

In the reduction circuit 201, the aspect ratio of length to width is corrected by performing reduction in only the vertical direction and not in the horizontal direction. Further, in the contour-compensation luminance signal generation circuit 302, the method of generating a luminance signal is changed according to the reduction ratio $\alpha$ ($0<\alpha<1$) in the vertical direction. More specifically, the luminance signal is generated in the following manner:

$$\text{when } \alpha \leq \tfrac{1}{2}, YA=0.3R+0.3G1+0.3G2+0.1B \quad (8)$$

$$\text{when } \alpha > \tfrac{1}{2}, YA=0.5G1+0.5G2 \quad (9)$$

In addition, in the luminance signal conversion circuit 305, the luminance signal is changed in the following manner according to the reduction ratio $\alpha$ in the vertical direction:

$$\text{when } \alpha \leq \tfrac{1}{2}, Y=YA$$

$$\text{when } \alpha > \tfrac{1}{2}, Y=YA+0.167U+0.5V$$

By adopting the above configuration, even when thinning ratios at which pixels are read out from the image sensor are different for the horizontal and vertical directions, it is possible to generate a reduced image in which aliasing has been appropriately suppressed.

According to the present embodiment, a configuration is adopted so as to change a method of generating a luminance signal in accordance with the reduction ratio in the vertical direction. However, a configuration may also be adopted so as to change the method of generating a luminance signal in accordance with the reduction ratio in the horizontal direction. For example, the following configuration may be adopted. That is, the luminance signal is created based on the two equations (8) and (9). A contour compensation signal based on the luminance signal of equation (8) is generated with respect to the horizontal direction for which thinning has not been performed. A contour compensation signal with respect to the vertical direction for which thinning has been performed is generated by selecting one of equation (8) and equation (9) in accordance with the reduction ratio or by performing weighted addition in accordance with an angle.

Other Embodiments

Aspects of the present invention can also be realized by a computer of a system or apparatus (or devices such as a CPU or MPU) that reads out and executes a program recorded on a non-transitory memory device to perform the functions of the above-described embodiments, and by a method, the steps of which are performed by a computer of a system or apparatus by, for example, reading out and executing a program recorded on a non-transitory memory device to perform the functions of the above-described embodiments. For this purpose, the program is provided to the computer for example via a network or from a recording medium of various types serving as the non-transitory memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No 2011-143390, filed on Jun. 28, 2011, which is hereby incorporated by reference herein in its entirety.

The invention claimed is:

1. An image processing apparatus, comprising:
reduction means for generating a reduced image of an input image having a Bayer pattern;
luminance signal generation means for generating a first luminance signal based on the reduced image;
color signal generation means for generating a color signal from the reduced image;
conversion means for converting the first luminance signal into a second luminance signal;
contour compensation signal generation means for generating a contour compensation signal based on the first luminance signal; and
combination means for combining the second luminance signal and the contour compensation signal;
wherein when a reduction ratio that indicates a ratio of a number of pixels of the reduced image with respect to the input image is greater than a threshold, said luminance signal generation means generates the first luminance signal in which a composition ratio between Red, Green, and Blue components included in the Bayer pattern has a first ratio, and when the reduction ratio is less than or equal to the threshold, said luminance signal generation means generates the first luminance signal in which the composition ratio has a second ratio, wherein the first ratio has a ratio of the Green component greater than that of the second ratio,
and wherein when the reduction ratio is greater than the threshold, said conversion means converts the first luminance signal into the second luminance signal by adding the color signal to the first luminance signal, and when the reduction ratio is less than or equal to the threshold, said conversion means outputs the first luminance signal as the second luminance signal.

2. The image processing apparatus according to claim 1, further comprising a memory that stores the first luminance signal and the color signal;
wherein said conversion means reads the first luminance signal from said memory to convert the read first luminance signal into the second luminance signal,
and wherein said contour compensation signal generation means generates the contour compensation signal by reading the first luminance signal from said memory and performing filter processing with respect to the read first luminance signal.

3. The image processing apparatus according to claim 1, wherein when the reduction ratio is greater than the threshold, a composition ratio between Red, Green, and Blue components included in the converted second luminance signal equals the first ratio.

4. The image processing apparatus according to claim 1, wherein when reduction ratios of the reduced image differ depending on a direction in which the input image is reduced, said luminance signal generation means generates the first luminance signal in accordance with a smaller reduction ratio of the reduction ratios.

5. An image processing apparatus, comprising:
reduction means for generating a reduced image of an input image having a Bayer pattern;
luminance signal generation means for generating a first luminance signal based on the reduced image;
color signal generation means for generating a color signal from the reduced image;
conversion means for converting the first luminance signal into a second luminance signal;

contour compensation signal generation means for generating a contour compensation signal based on the first luminance signal; and combination means for combining the second luminance signal and the contour compensation signal, wherein when a reduction ratio that indicates a ratio of a number of pixels of the reduced image with respect to the input image is greater than a threshold, said luminance signal generation means generates the first luminance signal using only a Green component included in the Bayer pattern, and when the reduction ratio is less than or equal to the threshold, said luminance signal generation means generates the first luminance signal using Red, Green, and Blue components included in the Bayer pattern, and wherein when the reduction ratio is greater than the threshold, said conversion means converts the first luminance signal into the second luminance signal by adding the color signal to the first luminance signal, and when the reduction ratio is less than or equal to the threshold, said conversion means outputs the first luminance signal as the second luminance signal.

6. The image processing apparatus according to claim 5, further comprising a memory that stores the first luminance signal and the color signal;

wherein said conversion means reads the first luminance signal from said memory to convert the read first luminance signal into the second luminance signal, and wherein said contour compensation signal generation means generates the contour compensation signal by reading the first luminance signal from said memory and performing filter processing with respect to the read first luminance signal.

7. The image processing apparatus according to claim 5, wherein when the reduction ratio is greater than the threshold, a composition ratio between Red, Green, and Blue components included in the converted second luminance signal equals the first ratio.

8. The image processing apparatus according to claim 5, wherein when reduction ratios of the reduced image differ depending on a direction in which the input image is reduced, said luminance signal generation means generates the first luminance signal in accordance with a smaller reduction ratio of the reduction ratios.

9. A control method of an image processing apparatus, comprising the steps of:

generating a reduced image of an input image having a Bayer pattern;

generating a first luminance signal based on the reduced image;

generating a color signal from the reduced image;

converting the first luminance signal into a second luminance signal;

generating a contour compensation signal based on the first luminance signal; and combining the second luminance signal and the contour compensation signal;

wherein when a reduction ratio that indicates a ratio of a number of pixels of the reduced image with respect to the input image is greater than a threshold, the step of generating the first luminance signal generates the first luminance signal in which a composition ratio between Red, Green, and Blue components included in the Bayer pattern has a first ratio, and when the reduction ratio is less than or equal to the threshold, the step of generating a first luminance signal generates the first luminance signal in which the composition ratio has a second ratio, wherein the first ratio has a ratio of the Green component greater than that of the second ratio, and wherein when the reduction ratio is greater than the threshold, the step of converting the first luminance signal into a second luminance signal converts the first luminance signal into the second luminance signal by adding the color signal to the first luminance signal, and when the reduction ratio is less than or equal to the threshold, the step of converting the first luminance signal into a second luminance signal outputs the first luminance signal as the second luminance signal.

10. A control method of an image processing apparatus, comprising the steps of:

generating a reduced image of an input image having a Bayer pattern;

generating a first luminance signal based on the reduced image;

generating a color signal from the reduced image;

converting the first luminance signal into a second luminance signal;

generating a contour compensation signal based on the first luminance signal; and combining the second luminance signal and the contour compensation signal;

wherein when a reduction ratio that indicates a ratio of a number of pixels of the reduced image with respect to the input image is greater than a threshold, the step of generating a first luminance signal generates the first luminance signal using only a Green component included in the Bayer pattern, and when the reduction ratio is less than or equal to the threshold, the step of generating a first luminance signal generates the first luminance signal using Red, Green, and Blue components included in the Bayer pattern, and wherein when the reduction ratio is greater than the threshold, the step of converting the first luminance signal into a second luminance signal converts the first luminance signal into the second luminance signal by adding the color signal to the first luminance signal, and when the reduction ratio is less than or equal to the threshold, the step of the first luminance signal into a second luminance signal outputs the first luminance signal as the second luminance signal.

* * * * *